(12) United States Patent
Okuda

(10) Patent No.: US 8,825,028 B2
(45) Date of Patent: Sep. 2, 2014

(54) CALLER INFORMATION DISPLAYING METHOD, CELLULAR PHONE, AND NON-TRANSITORY COMPUTER READABLE MEDIUM STORING PROGRAM

(75) Inventor: Shinya Okuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/388,397

(22) PCT Filed: Jun. 30, 2010

(86) PCT No.: PCT/JP2010/004303
§ 371 (c)(1),
(2), (4) Date: Feb. 1, 2012

(87) PCT Pub. No.: WO2011/024365
PCT Pub. Date: Mar. 3, 2011

(65) Prior Publication Data
US 2012/0142323 A1 Jun. 7, 2012

(30) Foreign Application Priority Data

Aug. 25, 2009 (JP) ................................. 2009-194380

(51) Int. Cl.
*H04M 3/42* (2006.01)
*H04M 1/725* (2006.01)
*H04M 1/57* (2006.01)

(52) U.S. Cl.
CPC .......... *H04M 1/575* (2013.01); *H04M 2250/02* (2013.01); *H04M 1/7253* (2013.01)
USPC ......................................... 455/415; 455/41.3

(58) Field of Classification Search
USPC ................................................ 455/41.2, 41.3
See application file for complete search history.

(56) References Cited

U.S. PATENT DOCUMENTS

| 7,016,707 | B2 | 3/2006 | Fujisawa et al. |
| 2006/0286972 | A1 | 12/2006 | Kates |
| 2007/0225018 | A1 | 9/2007 | Cho |
| 2007/0232335 | A1 | 10/2007 | Harada et al. |
| 2010/0062714 | A1* | 3/2010 | Ozaki .......................... 455/41.3 |
| 2010/0197362 | A1 | 8/2010 | Saitoh et al. |

FOREIGN PATENT DOCUMENTS

| CN | 1389058 | 1/2003 |
| JP | 2005-210181 | 8/2005 |
| JP | 2006-041704 | 2/2006 |
| JP | 2006-180008 | 7/2006 |
| JP | 2009-118313 | 5/2009 |
| WO | WO 2008/069299 | 6/2008 |
| WO | WO 2009/060612 | 5/2009 |

OTHER PUBLICATIONS

International Search Report, PCT/JP2010/004303, Jul. 27, 2010.
Extended European Search Report dated Jul. 9, 2013; Application No. 10811424.0.
Chinese Office Action dated Nov. 11, 2013 in corresponding Chinese Patent Application No. 201080037973.2 with English translation of Chinese Office Action.
Japanese Office Action dated Dec. 10, 2013 in corresponding Japanese Patent Application No. 2011-528620 with English translation of Japanese Office Action.

* cited by examiner

*Primary Examiner* — Vladimir Magloire
(74) *Attorney, Agent, or Firm* — Young & Thompson

(57) ABSTRACT

Provided is a caller information displaying method capable of displaying caller information with latest data registered in a cellular phone on a Bluetooth device at an earlier timing. The caller information displaying method according to an exemplary embodiment is a caller information displaying method for displaying caller information on a Bluetooth device 20 capable of establishing a Bluetooth communication with a cellular phone 10, the method including: updating, by the cellular phone 10, incoming call history data 12 upon receiving an incoming call, and transmitting, to the Bluetooth device 20, caller information corresponding to a latest incoming call history in the updated incoming call history data 12; and receiving, by the Bluetooth device 20, the caller information transmitted from the cellular phone 10, and displaying the received caller information.

14 Claims, 2 Drawing Sheets

1

CALLER INFORMATION DISPLAYING METHOD, CELLULAR PHONE, AND NON-TRANSITORY COMPUTER READABLE MEDIUM STORING PROGRAM

TECHNICAL FIELD

The present invention relates to a caller information displaying method, a cellular phone, and a non-transitory computer readable medium storing a program, and more particularly, to a caller information displaying method, a cellular phone, and a non-transitory computer readable medium storing a program for causing a Bluetooth device capable of establishing a Bluetooth communication with a cellular phone to display caller information.

BACKGROUND ART

When a cellular phone and a Bluetooth device having a Bluetooth® communication function are connected through HFP (Hands Free Profile) or HSP (Headset Profile), an incoming call to the cellular phone can be notified by sound or vibration of the Bluetooth device. Further, the operation of the Bluetooth device enables answering an incoming call, making a call, and ending a call, for example.

Furthermore, if phone book data of the cellular phone is transmitted in advance to the Bluetooth device, a caller who has made a call can be specified on the Bluetooth device during an incoming call.

Patent Literature 1, for example, discloses a handsfree apparatus for use in a vehicle that synchronizes phone book data and outgoing/incoming call history data by establishing an automatic connection with a cellular phone through PBAP (Phone Book Access Profile). In Patent Literature 1, the PBAP connection between the cellular phone and the handsfree apparatus for use in a vehicle is established at a predetermined timing in the state where the cellular phone is in a waiting state within a Bluetooth communication range.

In Patent Literature 1, however, transmission of the phone book data to the Bluetooth device through PBAP is not carried out during the incoming call. For this reason, caller information may not be displayed with the latest data registered in the cellular phone. In other words, when the phone book data stored in the cellular phone is edited after the transmission of the phone book data, the caller information cannot be displayed with the latest edited phone book data. Accordingly, the caller information to be displayed during the incoming call is different from the edited phone book data. In the case of receiving an incoming call from a call counterpart newly registered in the phone book data after the transmission of the phone book data, caller information, such as a caller name, cannot be displayed on the Bluetooth device.

While the phone book data is not transmitted in advance to the Bluetooth device, Patent Literature 2 discloses a technique in which caller information is displayed on a Bluetooth device by using phone book data which is stored in a cellular phone and which is searched based on a caller telephone number included in an incoming signal from a base station.

CITATION LIST

Patent Literature

[Patent Literature 1] Japanese Unexamined Patent Application Publication No. 2009-118313
[Patent Literature 2] Japanese Unexamined Patent Application Publication No. 2005-210181

SUMMARY OF INVENTION

Technical Problem

In Patent Literature 2, however, data for one phone book corresponding to the caller telephone number read from the incoming signal is searched and a ring tone is then generated by the Bluetooth device by HFP connection. After that, the searched data for one phone book is transmitted to the Bluetooth device by OPP (Object Push Profile) connection. Thus, Patent Literature 2 requires processing of searching the phone book data, so that the timing for displaying the caller information on the Bluetooth device is delayed by the amount of time required for the search processing.

The present invention has been made to solve the above-mentioned problems, and has an object to provide a caller information displaying method, a cellular phone, and a non-transitory computer readable medium storing a program which are capable of displaying caller information with latest data registered in a cellular phone on a Bluetooth device at an earlier timing.

Solution to Problem

An exemplary aspect of the present invention is a caller information displaying method including: updating, by a cellular phone, incoming call history data upon receiving an incoming call, and transmitting caller information to a Bluetooth device capable of establishing a Bluetooth communication with the cellular phone, the caller information corresponding to a latest incoming call history in the incoming call history data updated; and receiving, by the Bluetooth device, the caller information transmitted from the cellular phone, and displaying the caller information received.

Another exemplary aspect of the present invention is a non-transitory computer readable medium storing a program for causing a cellular phone capable of establishing a Bluetooth communication with a Bluetooth device having a Bluetooth communication function to execute processing including: updating incoming call history data upon receiving an incoming call; and transmitting, to the Bluetooth device, caller information corresponding to a latest incoming call history in the incoming call history data updated.

Advantageous Effects of Invention

According to exemplary aspects of the present invention, it is possible to provide a caller information displaying method, a cellular phone, and a non-transitory computer readable medium storing a program which are capable of displaying caller information with latest data registered in a cellular phone on a Bluetooth device at an earlier timing.

DESCRIPTION OF EMBODIMENTS

Hereinafter, an exemplary embodiment of the present invention will be described with reference to the drawings. For clarity of explanation, the following description and the drawings are omitted or simplified as appropriate.

Figure 1:
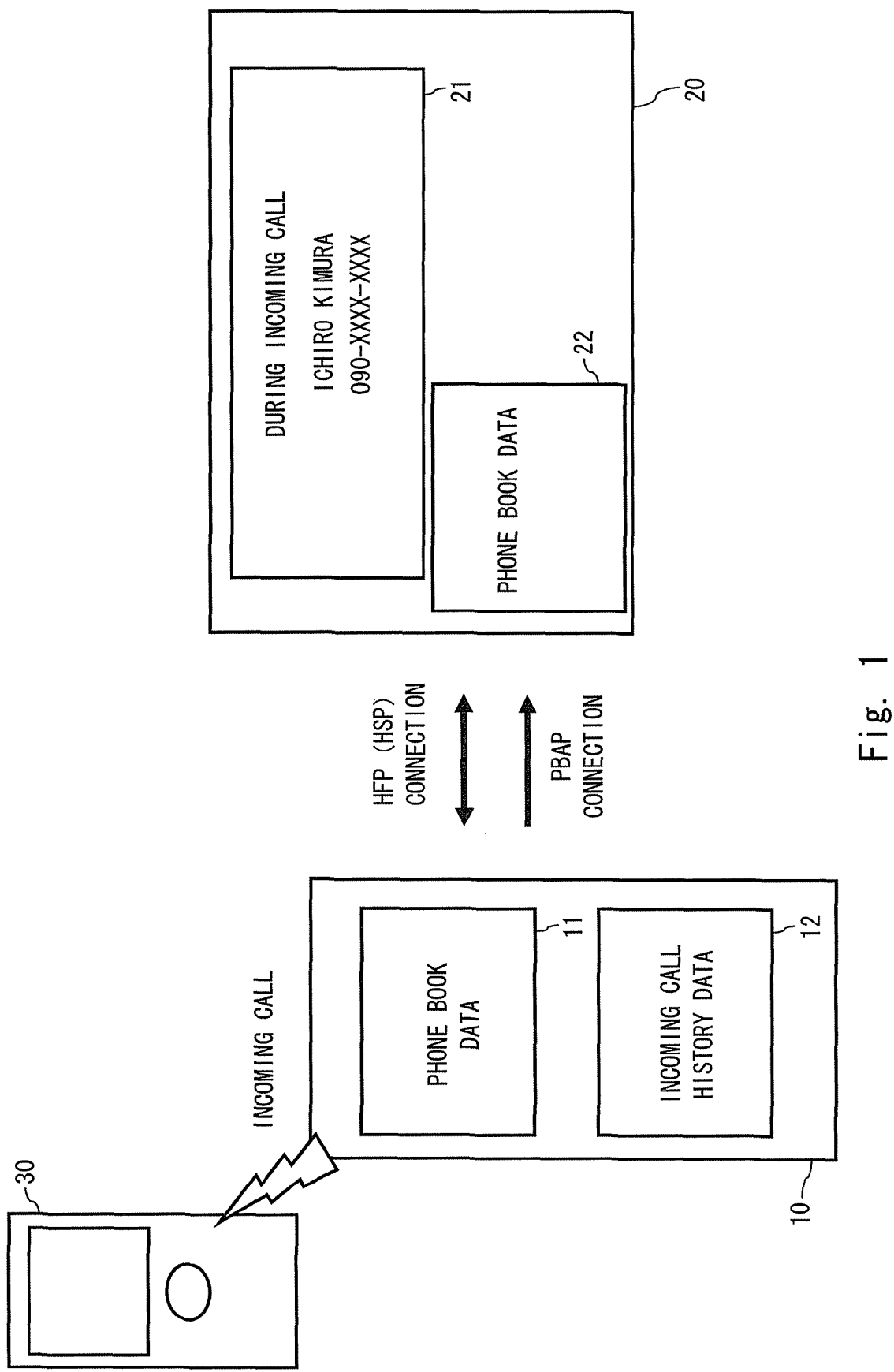
FIG. 1 is a diagram showing a configuration of a caller information system according to an exemplary embodiment of the present invention.

First, a configuration of a caller information display system according to an exemplary embodiment of the present invention will be described with reference to FIG. 1. FIG. 1 is a diagram showing the configuration of the caller information system according to an exemplary embodiment of the present invention.

As shown in FIG. 1, the caller information display system according to this exemplary embodiment includes a cellular phone 10 and a Bluetooth device 20.

The cellular phone 10 includes at least phone book data 11 in which the name (registered name) and telephone number of a call counterpart, for example, are registered, and incoming call history data 12 in which an incoming call history is recorded. Upon receiving an incoming call from an opposite telephone 30, which is a caller, the cellular phone 10 updates the incoming call history data 12. The cellular phone 10 then transmits caller information to the Bluetooth device 20 by using a caller information displaying method which will be described later. The operation of the cellular phone 10 is controlled by a program.

The Bluetooth device 20 is a device capable of establishing Bluetooth communication with the cellular phone 10. The Bluetooth device 20 is, for example, a car navigation device. The Bluetooth device 20 has a Bluetooth communication function for establishing Bluetooth communication with the cellular phone 10. The Bluetooth device 20 can establish Bluetooth communication with the cellular phone 10 when the Bluetooth device 20 exists within a Bluetooth communication area of the cellular phone 10.

The Bluetooth device 20 includes at least a display 21. The display 21 is display means for displaying information such as caller information. The display 21 is, for example, a display device such as a liquid crystal display device or an organic EL (electroluminescence) display device. The Bluetooth device 20 may further include phone book data 22 in which the name (registered name) and telephone number of a call counterpart, for example, are registered. For example, the phone book data 11 of the cellular phone 10 is transmitted to the Bluetooth device 20, so that the phone book data 22 can be registered in the Bluetooth device 20.

To establish a Bluetooth communication, the cellular phone 10 and the Bluetooth device 20 support HFP (Hands Free Profile) to make a hands-free call, or HSP (Head Set Profile) to communicate with a head set. The cellular phone 10 and the Bluetooth device 20 also support PBAP (Phone Book Access Profile) to transfer phone book data and transfer outgoing call history data and incoming call history data.

Figure 2:
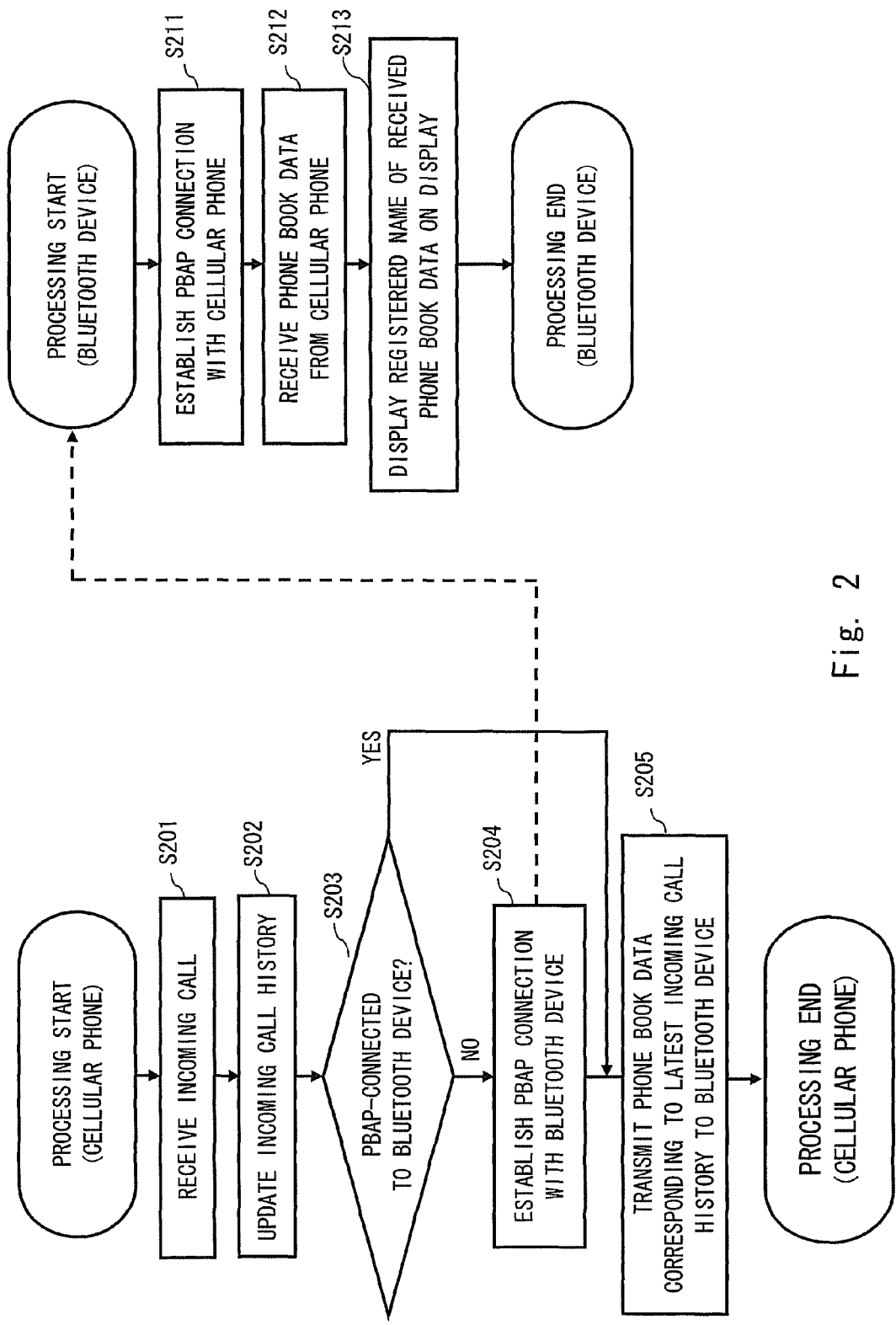
FIG. 2 is a flowchart showing operations of a cellular phone and a Bluetooth device according to an exemplary embodiment of the present invention.

Next, a caller information displaying method for displaying caller information using the caller information system configured as described above will be described with reference to FIG. 2. FIG. 2 is a flowchart showing operations of the cellular phone 10 and the Bluetooth device 20 according to an exemplary embodiment of the present invention.

In the following description, a case will be exemplified in which the cellular phone 10 and the Bluetooth device 20 do not support HFP/HSP automatic connection during an incoming call. Specifically, assume that the cellular phone 10 is preliminarily connected to the Bluetooth device 20 through HFP/HSP. Accordingly, the cellular phone 10 has already been connected to the Bluetooth device 20 through HFP/HSP during an incoming call.

As shown in FIG. 2, first, upon receiving an incoming call from the opposite telephone 30 (step S201), the cellular phone 10 updates the incoming call history (step S202). As a result, the latest incoming call history among a plurality of incoming call histories constituting the incoming call history data 12 of the cellular phone 10 is updated with the current incoming call.

Next, the cellular phone 10 determines whether the Bluetooth device 20, to which the cellular phone 10 is being connected through HFP/HSP, is connected to the cellular phone 10 through PBAP (step S203). As a result of determination, when the Bluetooth device 20 is not connected to the cellular phone 10 through PBAP (NO in step S203), the cellular phone 10 connects to the Bluetooth device 20 through PBAP (step S204). Specifically, an automatic connection through PBAP is established with the Bluetooth device 20 to which the cellular phone 10 is connected through HFP or HSP. Note that, as a result of determination, when the connection through PBAP has already been established with the Bluetooth device 20 (YES in step 203), the operation of step S204 will be omitted. In this manner, the Bluetooth device 20 is connected to the cellular phone 10 through PBAP (step S211).

Subsequently, the cellular phone 10 transmits phone book data corresponding to the latest incoming call history to the Bluetooth device 20 (step S205). Specifically, a phone book data item corresponding to the latest incoming call history in the phone book data 11 is transmitted. Here, in general, the incoming call histories included in the incoming call history data 12 are tied to the respective phone book data. For this reason, in this exemplary embodiment, it is only necessary to specify the phone book data to be transmitted to the Bluetooth device 20 from the latest incoming call history, and there is no need to search the phone book data 11. Accordingly, the phone book data corresponding to the latest incoming call history can be transmitted at a timing earlier than that of Patent Literature 2.

Next, the Bluetooth device 20 which is preliminarily connected to the cellular phone 10 through PBAP (step S211) by the operation described above receives the phone book data from the cellular phone 10 in the state of being connected to the cellular phone 10 through PBAP (step S212). Specifically, the Bluetooth device 20 being connected to the cellular phone 10 through PBAP receives the phone book data which has been transmitted in step 205 from the cellular phone 10 and which corresponds to the latest incoming call history.

Then, the Bluetooth device 20 displays the registered name of the received phone book data on the display 21 (step 213). Here, at least the registered name in the received phone book data is displayed as a caller name. Thus, the caller information is displayed on the Bluetooth device 20 with the latest data registered in the cellular phone 10.

Although the case has been exemplified in which the cellular phone 10 and the Bluetooth device 20 support PBAP and the phone book data corresponding to the latest incoming call history is transferred as caller information through PBAP connection, the present invention is not limited to this. Partial data including at least the registered name in the phone book data corresponding to the latest incoming call history may be transferred as caller information. Specifically, in the data included in the phone book data, only data necessary for display, such as a name and a telephone number, may be transferred. In this case, the cellular phone 10 and the Bluetooth device 20 are connected through a profile for transmitting caller information, and then the caller information is transferred through the profile. As the profile for transmitting the caller information, a profile supported by both the cellular phone and the Bluetooth device, such as OPP, can be used.

As described above, in the caller information displaying method of this exemplary embodiment, upon receiving an incoming call, the cellular phone 10 updates the incoming call history data 12 and transmits caller information corresponding to the latest incoming call history in the updated incoming call history data 12 to the Bluetooth device 20. Then, the Bluetooth device 20 having received the caller information transmitted from the cellular phone 10 displays the received caller information.

The present invention can also be implemented as a hardware configuration, and any processing can be implemented by causing a CPU (Central Processing Unit) to execute a computer program. The program of this exemplary embodiment causes the cellular phone 10 capable of establishing a Bluetooth communication with the Bluetooth device 20 having a Bluetooth communication function to execute processing of updating incoming call history data upon receiving an incoming call, and processing of transmitting caller information corresponding to the latest incoming call history in the updated incoming call history data to the Bluetooth device 20.

The program can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g. magneto-optical disks), CD-ROM (Read Only Memory), CD-R, CD-R/W, and semiconductor memories (e.g., mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

As described above, in this exemplary embodiment, upon receiving an incoming call, the cellular phone 10 updates the incoming call history data 12 and transfers caller information corresponding to the latest incoming call history to the Bluetooth device 20. The Bluetooth device 20 receives the caller information transmitted from the cellular phone 10, and displays the received caller information on the display 21. This method makes it possible to display the caller information with the latest data registered in the cellular phone 10 on the Bluetooth device 20.

In particular, in this exemplary embodiment, the caller information is specified from the phone book data tied to the latest incoming call history, which eliminates the need for processing of searching the phone book data 11. On the other hand, Patent Literature 2 requires processing of searching the phone book data, so that the timing for displaying the caller information on the Bluetooth device is delayed by the amount of time required for the search processing. Accordingly, in this exemplary embodiment, the caller information can be displayed on the Bluetooth device 20 at a timing earlier than that of Patent Literature 2. Therefore, according to this exemplary embodiment, it is possible to provide a caller information displaying method, a cellular phone, and a program which are capable of displaying caller information with the latest data registered in a cellular phone on a Bluetooth device at an earlier timing.

Note that the present invention is not limited to the exemplary embodiment described above, but can be modified as appropriate without departing from the scope of the present invention. For example, although the case has been exemplified in which the cellular phone 10 is preliminarily connected to the Bluetooth device 20 through HFP/HSP, the HFP/HSP automatic connection may be established during an incoming call. For example, an invention in which the cellular phone 10 establishes an automatic connection through HFP or HSP with the Bluetooth device 20 during an incoming call, thereby eliminating the need for preliminarily establishing a connection (see Japanese Unexamined Patent Application Publication No. 2009-124243) may be combined with the present invention. As a result, an automatic connection through HFP or HSP and an automatic connection through PBAP can be simultaneously established during an incoming call.

In the above description, the caller information received from the cellular phone 10 is displayed on the display 21, but the method is not limited to display. The caller information may be informed using other informing methods such as sound.

Although the present invention has been described above with reference to an exemplary embodiment, the present invention is not limited to the above exemplary embodiment. The configuration and details of the present invention can be modified in various manners which can be understood by those skilled in the art within the scope of the present invention.

This application is based upon and claims the benefit of priority from Japanese patent application No. 2009-194380, filed on Aug. 25, 2009, the disclosure of which is incorporated herein in its entirety by reference.

REFERENCE SIGNS LIST

10 CELLULAR PHONE
11 PHONE BOOK DATA
12 INCOMING CALL HISTORY DATA
20 BLUETOOTH DEVICE
21 DISPLAY
22 PHONE BOOK DATA
30 OPPOSITE CELLULAR PHONE

The invention claimed is:

1. A caller information displaying method, comprising:
upon receiving, by a cellular phone, an incoming call,
updating, by the cellular phone, incoming call history data,
accessing the updated incoming call history data,
obtaining a latest entry in the updated incoming call history data and caller information for the latest entry in the updated incoming call history data,
determining whether the cellular phone is connected to the Bluetooth device through a profile for transmitting the caller information, and
connecting to the Bluetooth device through the profile for transmitting the caller information when the cellular phone is not connected to the Bluetooth device;
thereafter transmitting only the caller information for the latest entry in the updated incoming call history data prior to completion of the incoming call to a Bluetooth device configured to establish a Bluetooth communication with the cellular phone; and
receiving, by the Bluetooth device, the caller information transmitted from the cellular phone, and displaying the received caller information, without searching phone book data included in the cellular phone, prior to completion of the incoming call.

2. The caller information displaying method according to claim 1, wherein the caller information transmitted to the Bluetooth device is phone book data tied to the latest incoming call history.

3. The caller information displaying method according to claim 1, wherein the caller information transmitted to the Bluetooth device is partial data including at least a registered name in the phone book data tied to the latest incoming call history.

4. The caller information displaying method according to claim 1, wherein the Bluetooth device displays at least a registered name in the caller information received.

5. A cellular phone that transmits caller information to the Bluetooth device by using a caller information displaying method according to claim 1.

6. A non-transitory computer readable medium storing a program for causing a cellular phone capable of establishing a Bluetooth communication with a Bluetooth device having a Bluetooth communication function to execute processing comprising:

upon receiving, by the cellular phone, an incoming call, updating incoming call history data;
accessing the updated incoming call history data;
obtaining a latest entry in the updated incoming call history data and caller information for the latest entry in the updated incoming call history data;
determining whether the cellular phone is connected to the Bluetooth device through a profile for transmitting the caller information;
connecting to the Bluetooth device through the profile for transmitting the caller information when the cellular phone is not connected to the Bluetooth device; and
transmitting, to the Bluetooth device, only the caller information for the latest entry in the updated incoming call history data, without searching phone book data included in the cellular phone, prior to completion of the incoming call.

7. The non-transitory computer readable medium storing a program according to claim 6, wherein the caller information transmitted to the Bluetooth device is phone book data tied to the latest incoming call history.

8. The non-transitory computer readable medium storing a program according to claim 6, wherein the caller information transmitted to the Bluetooth device is partial data including at least a registered name in the phone book data tied to the latest incoming call history.

9. The caller information displaying method according to claim 2, wherein the Bluetooth device displays at least a registered name in the caller information received.

10. The caller information displaying method according to claim 3, wherein the Bluetooth device displays at least a registered name in the caller information received.

11. A cellular phone that transmits caller information to the Bluetooth device by using a caller information displaying method according to claim 2.

12. A cellular phone that transmits caller information to the Bluetooth device by using a caller information displaying method according to claim 3.

13. A cellular phone that transmits caller information to the Bluetooth device by using a caller information displaying method according to claim 4.

14. A cellular phone that transmits caller information to the Bluetooth device by using a caller information displaying method according to claim 1.

* * * * *